(12) United States Patent
Geiger et al.

(10) Patent No.: US 10,635,930 B2
(45) Date of Patent: Apr. 28, 2020

(54) PATIENT POSITION CONTROL FOR SCANNING

(71) Applicant: Siemens Healthcare GmbH, Erlangen (DE)

(72) Inventors: Bernhard Geiger, Cranbury, NJ (US); Atilla Peter Kiraly, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 80 days.

(21) Appl. No.: 15/441,640

(22) Filed: Feb. 24, 2017

(65) Prior Publication Data

US 2018/0247427 A1  Aug. 30, 2018

(51) Int. Cl.
*G06T 7/70* (2017.01)
*G06K 9/62* (2006.01)
*G06T 7/73* (2017.01)
*G06K 9/00* (2006.01)

(52) U.S. Cl.
CPC ....... *G06K 9/6202* (2013.01); *G06K 9/00201* (2013.01); *G06K 9/00369* (2013.01); *G06T 7/73* (2017.01); *G06K 9/6256* (2013.01); *G06K 2209/05* (2013.01); *G06T 2207/10024* (2013.01); *G06T 2207/10028* (2013.01); *G06T 2207/10081* (2013.01); *G06T 2207/30196* (2013.01)

(58) Field of Classification Search
CPC ............. G06K 9/6202; G06K 9/00201; G06K 9/00369; G06K 9/6256; G06K 2209/05; G06T 7/73; G06T 2207/10024; G06T 2207/10028; G06T 2207/10081; G06T 2207/30196
See application file for complete search history.

(56) References Cited

U.S. PATENT DOCUMENTS

| 4,706,296 | A | * | 11/1987 | Pedotti | G06T 7/70 382/278 |
| 6,059,718 | A | * | 5/2000 | Taniguchi | A61B 1/0005 600/117 |
| 7,251,845 | B2 | * | 8/2007 | Schaller | A61B 5/0555 5/613 |

(Continued)

FOREIGN PATENT DOCUMENTS

WO  WO2016073841 A1  5/2016

OTHER PUBLICATIONS

Stippel, Gjenna, et al. "Automatic delineation of body contours on cone-beam CT images using a delineation booster." Physics in Medicine & Biology 57.13 (2012): N225. (Year: 2012).*

(Continued)

*Primary Examiner* — David F Dunphy

(57) ABSTRACT

For patient positioning for scanning, a current pose of a patient is compared to a desired pose. The desired pose may be based on a protocol or a pose of the same patient in a previous examination. Any differences in pose, such as arm position, leg position, head orientation, and/or torso orientation (e.g., laying on side, back, or stomach), are communicated. By changing the current pose of the patient to be more similar to the desired pose, a more consistent and/or registerable dataset may be acquired by scanning the patient.

13 Claims, 3 Drawing Sheets

(56) References Cited

U.S. PATENT DOCUMENTS

| | | | | |
|---|---|---|---|---|
| 7,327,140 B2* | 2/2008 | Haider | | G01R 33/288 324/307 |
| 8,235,530 B2* | 8/2012 | Maad | | A61B 6/0407 250/492.1 |
| 9,766,308 B2* | 9/2017 | Biber | | G01R 33/48 |
| 2002/0012457 A1* | 1/2002 | Van Vaals | | A61B 5/055 382/128 |
| 2005/0096515 A1* | 5/2005 | Geng | | A61N 5/1049 600/315 |
| 2005/0265516 A1* | 12/2005 | Haider | | A61B 5/0555 378/20 |
| 2006/0002630 A1* | 1/2006 | Fu | | G06K 9/32 382/294 |
| 2006/0110049 A1* | 5/2006 | Liang | | G06K 9/00362 382/224 |
| 2008/0025584 A1* | 1/2008 | Kunz | | G06K 9/4638 382/128 |
| 2008/0205719 A1* | 8/2008 | Pekar | | G06T 3/0081 382/128 |
| 2009/0048505 A1* | 2/2009 | Kuth | | A61B 5/0555 600/410 |
| 2009/0163799 A1* | 6/2009 | Erbel | | A61B 6/025 600/424 |
| 2009/0180591 A1* | 7/2009 | Baumgart | | A61B 6/463 378/98.12 |
| 2009/0285357 A1* | 11/2009 | Khamene | | A61B 6/08 378/20 |
| 2009/0311655 A1* | 12/2009 | Karkanias | | G09B 23/28 434/262 |
| 2011/0019889 A1* | 1/2011 | Gering | | A61B 6/032 382/131 |
| 2011/0102549 A1* | 5/2011 | Takahashi | | A61C 1/084 348/46 |
| 2013/0127620 A1* | 5/2013 | Siebers | | G08B 21/02 340/573.1 |
| 2013/0172732 A1 | 7/2013 | Kiraly et al. | | |
| 2013/0287167 A1* | 10/2013 | Gum | | A61N 5/1049 378/20 |
| 2013/0296682 A1* | 11/2013 | Clavin | | A61B 6/5247 600/407 |
| 2014/0125695 A1* | 5/2014 | Lodron | | G06T 7/0024 345/629 |
| 2015/0077113 A1* | 3/2015 | Benner | | A61B 5/721 324/318 |
| 2015/0182191 A1* | 7/2015 | Caluser | | A61B 8/5246 600/440 |
| 2015/0213646 A1* | 7/2015 | Ma | | G06T 17/20 345/420 |
| 2015/0293188 A1* | 10/2015 | Haider | | G01R 33/34007 324/307 |
| 2015/0320512 A1* | 11/2015 | Gassner | | A61B 90/37 348/79 |
| 2016/0015329 A1* | 1/2016 | Kohlrausch | | A61B 5/1113 340/573.4 |
| 2016/0038090 A1* | 2/2016 | Heismann | | A61B 5/0059 600/410 |
| 2016/0213951 A1* | 7/2016 | Uhlemann | | A61N 5/1049 |
| 2016/0275079 A1 | 9/2016 | Kluckner et al. | | |
| 2016/0275721 A1* | 9/2016 | Park | | G06T 17/205 |
| 2016/0306924 A1* | 10/2016 | Singh | | G06F 19/321 |
| 2017/0049529 A1* | 2/2017 | Hannemann | | A61B 6/032 |
| 2017/0095197 A1* | 4/2017 | Kleiner | | A61B 5/0071 |
| 2017/0109881 A1* | 4/2017 | Avendi | | G06T 7/149 |
| 2017/0119329 A1* | 5/2017 | Warner | | A61B 6/12 |
| 2017/0186157 A1* | 6/2017 | Boettger | | G06T 7/50 |
| 2017/0220709 A1* | 8/2017 | Wan | | A61N 5/1048 |
| 2017/0249423 A1* | 8/2017 | Wang | | A61B 6/488 |
| 2017/0311841 A1* | 11/2017 | Rothgang | | A61B 5/0555 |
| 2017/0354385 A1* | 12/2017 | Lerch | | A61B 6/032 |
| 2018/0061036 A1* | 3/2018 | Mostafavi | | H04N 5/2226 |
| 2018/0089534 A1* | 3/2018 | Ye | | G06K 9/00295 |
| 2018/0185113 A1* | 7/2018 | Gregerson | | A61B 90/37 |
| 2018/0193098 A1* | 7/2018 | Caluser | | A61B 5/7207 |
| 2018/0225993 A1* | 8/2018 | Buras | | A61B 8/06 |
| 2018/0315188 A1* | 11/2018 | Tegzes | | G06K 9/2054 |
| 2018/0360313 A1* | 12/2018 | Zhang | | A61B 5/004 |

OTHER PUBLICATIONS

Elgammal et al, "Inferring 3D Body Pose from Silhouettes using Activity Manifold Learning", 2004, Proceedings of the 2004 IEEE Computer Society Conference on Computer Vision and Pattern Recognition (CVPR'04), 8 pages (Year: 2004).*

Brezovich, Ivan A., and Stephen Jordan. "A device for precision positioning and alignment of room lasers to diminish their contribution to patient setup errors." J. Appl. Clin. Med. Phys 8.4 (2007): 45-53.

Gamex. "Micro Fixed Lasers for Radiotherapy and MRI." Oct. 17, 2016. p. 1-2.

* cited by examiner

PATENT POSITION CONTROL FOR SCANNING

TECHNICAL FIELD

The present teachings relate generally to patient position for scanning, such as positioning a patient in a desired pose for an initial scan and/or in a same pose for each of a sequence of scans.

BACKGROUND

In cases where a patient is to be scanned at multiple timepoints, it is beneficial to register results with a previous dataset to detect changes between scans. Due to differences in the patient or patient pose, the dataset results of the scans being compared may not be spatially aligned. Deformable registration transforms one dataset to match the other dataset voxel by voxel. These three-dimensional deformable registration methods are more likely to succeed if the changes from one scan to the next are minimal. For example, the arms being up in one acquisition and down in another may make registration less reliable.

For more reliable registration, it is advantageous to position the patient in a similar way for a current scan as the patient was positioned for a previous scan. Manual positioning may be inconsistent. Precise alignment across treatments is desired for radiation therapy. In these cases, the patient is fixed during each application in a plastic mold that is fabricated before the first acquisition, or markers are tattooed on the patient skin for aligning with a projected target during each treatment. These approaches are expensive or invasive. In a general scanning situation, especially for a first diagnostic scan, it is not known that a follow-up scan is needed, so expensive or invasive approaches may not be used.

SUMMARY

By way of introduction, the preferred embodiments described below include methods, systems, and computer readable media with instructions for patient positioning for scanning. A current pose of a patient is compared to a desired pose. The desired pose may be based on a protocol or a pose of the same patient in a previous examination. Any differences in pose, such as arm position, leg position, head orientation, and/or torso orientation (e.g., laying on side, back, or stomach), are communicated. By changing the current pose of the patient to be more similar to the desired pose, a more consistent and/or registerable dataset may be acquired by scanning the patient.

In a first aspect, a method is provided for patient positioning for scanning. A first pose of a patient is determined from a first examination. The first pose is determined from a depth camera image, scan data from the first examination, or both. A depth camera, the medical scanner, or both senses a patient on a bed of a medical scanner for a second examination at a different time than the first examination. A second pose of the patient is determined from the sensing. The first pose is compared to the second pose. A change in pose based on the comparing is transmitted so that the second pose matches the first pose.

In a second aspect, a method is provided for patient positioning for scanning. A depth camera, the medical scanner, or both captures data representing a patient on a bed of a medical scanner. A first pose of the patient is determined from the data. The first pose is compared to a second pose. A change in pose of the patient on the bed so that the first pose matches the second pose is transmitted. The medical scanner scans the patient after conforming to the change in the pose.

In a third aspect, a system is provided for patient positioning for scanning. A diagnostic imager has a patient bed. A camera is configured to detect a surface of a body on the patient bed. A processor is configured to determine a pose of the body from the surface and identify a difference in the pose of the body from another pose. A display is configured to indicate a change to reduce the difference.

The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

Patient position is adjusted for scanning. Data from a previous examination of that patient may be used to align the patient roughly in the same position. The adjustment is automatically identified and communicated to a user or patient. Where the patient is scanned across multiple time points, more consistent acquisition across time points is performed. Comparisons of scans from different times points may benefit from the consistency.

Figure 1:
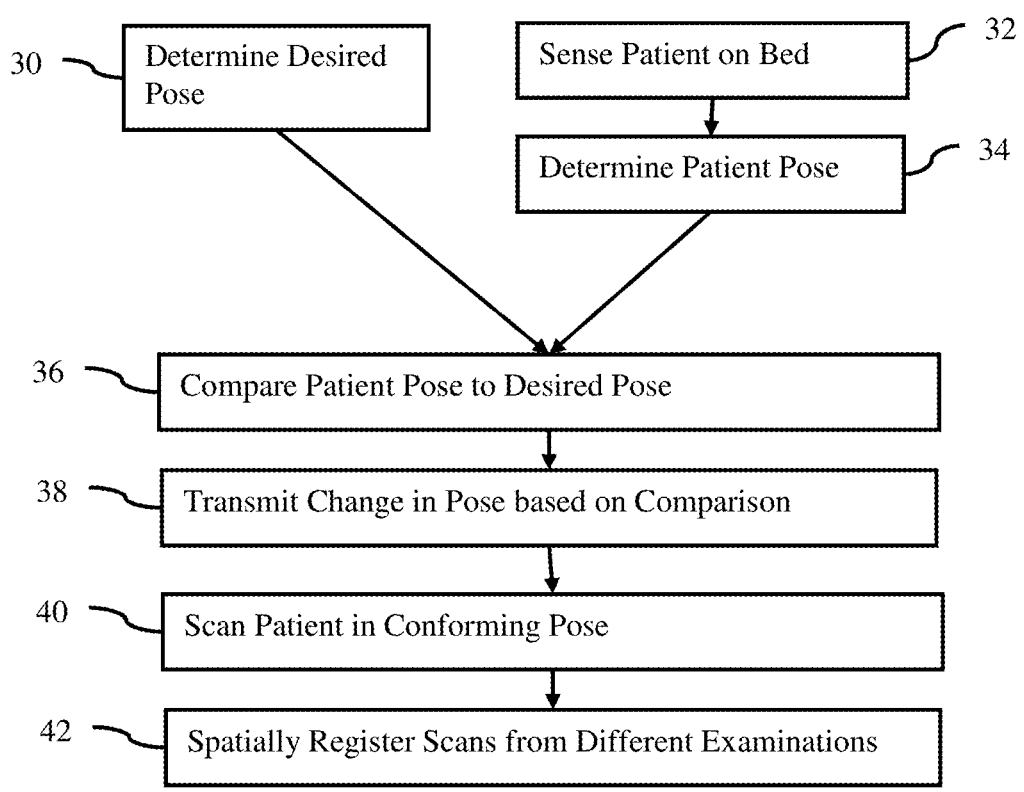
FIG. 1 is a flow chart diagram of one embodiment of a method for patient positioning for scanning.

FIG. 1 shows one embodiment of a method for patient positioning for scanning. The method includes determining a current pose of a patient on a bed of a medical scanner and comparing the current pose to a desired pose. Any differences in pose are communicated to the patient or technician so that the patient's pose is altered to the desired pose. In the embodiment of FIG. 1, the desired pose is from any source, such as a protocol, previous scan, or previous depth camera image (e.g., point cloud).

Figure 2:
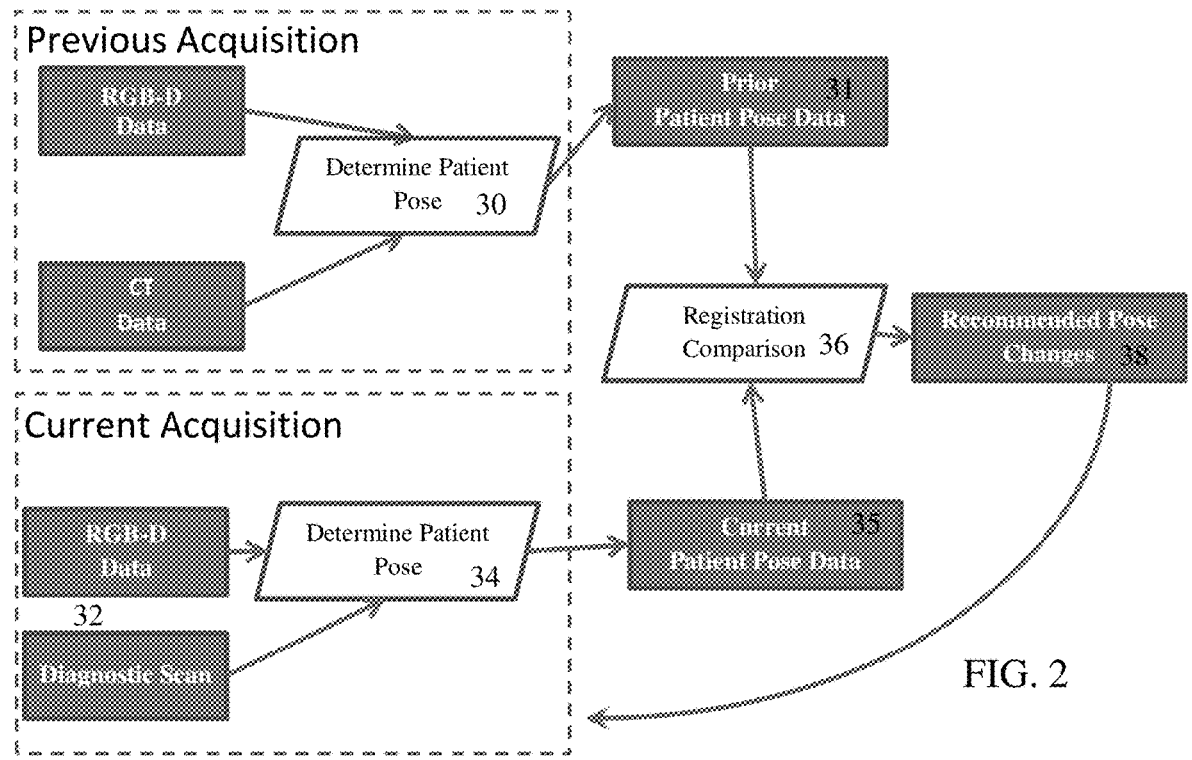
FIG. 2 is a flow chart diagram of another embodiment of the method for patient positioning for scanning.

FIG. 2 is a flow chart diagram of another embodiment of the method for patient positioning for scanning. FIG. 2 shows the source of the desired pose determination of act 30 as scan data and/or depth camera image from a previous examination of the patient. FIG. 2 concludes with recommending the change in pose whereas FIG. 1 includes performing the subsequent or current scan once the patient is in the desired pose. The results of the scan may be registered with results from previous scans.

FIGS. 1 and 2 show data flows to properly orient the patient before acquisition. In one embodiment, a previous acquisition of the patient includes a computed tomography (CT) volume and/or a color image+depth (e.g., red green blue-depth (RGB-D) image). The depth may be with a black and white or other image. An image without depth information may be used, such as by detecting a pose from the image. In examples below, RGB-D is used. These previous data are used to determine the pose held during the original acquisition. In the current acquisition, data from the RGB-D camera and/or from a imaging scan are used to determine the current patient pose. The differences between previous and current patient poses are computed, and recommended pose changes are determined. As a simple example, if the patient had theft left arm down in the previous acquisition but theft left arm is up prior to the current acquisition, this difference is determined and then communicated to the operator or patient. Once the pose is determined to be the same as before, the current acquisition can proceed.

The methods of FIGS. 1 and 2 may include additional, different, or fewer acts. For example, acts 40 and 42 of FIG. 1 are not performed or are included in the acts of FIG. 2. As another example, the desired pose of act 30 is based on previous acquisition in FIG. 1 as shown in FIG. 2, or the desired pose is determined in act 30 of FIG. 2 without the previous acquisition. In yet another example, acts are repeated to verify the current pose as correct prior to the scanning of act 40.

In the examples discussed herein, computed tomography is used. Performing a scout scan in computed tomography to obtain a topogram may result in additional radiation being applied to the patient. The scan data from the scout scan may be used to determine pose. Rather than using scout, navigation, or other alignment scans, depth camera information may be used to properly position the patient. The use of the depth data from a depth camera may avoid the additional radiation or time to pre-scan. In other embodiments, the medical scan data is for positron emission tomography (PET), single photon emission tomography (SPECT), magnetic resonance, ultrasound, fluoroscopy, x-ray, or other medical diagnostic scanning.

The acts are performed in the order shown (top to bottom or numerical) or a different order. For example, act 30 is performed at a same time, prior to, or after act 32 or 34.

A medical scanner, processor, server, workstation, computer, other device, or combinations of devices perform the acts of FIGS. 1 and 2. In one embodiment, the system of FIG. 3, of FIG. 4, or of FIG. 5 performs the methods. In another embodiment, a medical imager performs act 40. A controller or processor of the medical imager performs acts 30, 34, 36, and 42. A camera or the medical imager performs act 32. The controller, processor, network interface, a projector, speaker, or display performs act 38.

In act 30, a desired pose is determined. The desired pose is determined by look-up from a database or memory. Alternatively or additionally, the desired pose is determined by a processor (e.g., by a computer, controller of the medical scanner, and/or server). Data may be processed to determine the desired pose.

The desired pose is a position of the patient desired for a current scan. The desired pose may include whether the arms are by the head or by the torso, the arms are at the side against or spaced away from the torso, the legs together or spaced apart, the head or the feet at an entry end of the patient bed (i.e., head orientation), and/or the patient or torso laying on a side, back, or front on the patient bed (i.e., torso orientation). Other posing or body part positioning may be included in the pose, such as the rotation of the head relative to the torso or shoulders, bending of elbows and/or knees, hand position, finger position, and/or use of spacers between the patient and the patient bed.

In one embodiment, the desired pose represents a generic ideal patient position. A given diagnosis or treatment workflow follows a protocol. The protocol includes the desired pose. For example, the arms are to be positioned by the head for a CT scan of the lower abdomen for digestive, liver, or kidney scanning. The desired pose is defined by the scanning application. A model of a generic patient in the desired pose and/or parameterized descriptors (e.g., "legs together") are provided as the desired pose.

In another embodiment, the desired pose is determined from a previous examination. The examination corresponds to a different day. To assess treatment or further diagnosis, a same type of scan may be performed at different times, such as once a month, once a year, once every few years, or any other frequency. Each scan is performed at a different examination (e.g., a different appointment). To assist comparison of results from the scans of the different examinations, the patient pose is the same for each scan. The pose used in one or more previous scans is used as the desired pose.

In one embodiment, the initial scan is known to be an initial scan. The pose for the initial scan is based on a protocol, physician, or technician. The same pose is desired for each of the subsequent scans. The protocol or data from the initial scan may be used to determine the desired pose. In other embodiments, the initial scan is prior to diagnosis and/or realization that subsequent scan or scans are to be performed. Thus, a protocol may not define the pose. Instead, data captured from the initial or prior examination is used to determine the pose and that pose is then used for later scans as the desired pose. For example, a patient is scanned to determine whether there are signs of lung cancer. Where there are signs, a course of radiation therapy may be prescribed. After the treatment or interspersed with the treatment, additional scans are performed. The course is not known until after the initial scan. The scan data or other data captured for the initial scan may be used to determine the desired pose to be used for the subsequent scans. This first pose is established without a plan for treatment. The pose of the initial scan may be a pose dictated by protocol or not.

A processor determines the desired pose from scan data, a depth camera image, or both scan data and a depth camera image. The previous scan provides scan data representing the patient on the patient bed. The data may represent a volume, such as representing the patient in three dimensions (e.g., voxels). The data may represent a plane, such as scanning a cross-section or projecting to a detector plane (e.g., x-ray or fluoroscopy) representing the patient in two-dimensions (e.g., pixels). The data is in a scan format or a display format. The scan data is an image derived from scanning, is data used to create an image, or is data obtained by scanning but not used for imaging. The scan data represents the patient on the patient bed.

Where a camera, such as a depth camera, acquires an image of the patient in the previous scan, the image (e.g., RGB+D) may be used to determine the pose. A still image or video plus depth information is used to compute the patient position. The camera image is used as or to create a point cloud, surface mesh, or other three-dimensional representation of the patient. Alternatively, a camera without depth information is used. The resulting image provides pose information in two dimensions.

For the depth camera, a depth sensor measures depths relative to a surface of a patient. Any depth sensor may be used. The depth sensor provides three-dimensional sensor image data or depth data. In some embodiments, the depth data is captured via a camera. Any now known or later developed depth camera may be used, such as stereo cameras, structured-light devices (e.g., Microsoft Kinect, ASUS Xtion), time-of-flight devices (e.g., Creative TOF cameras), and combinations thereof. In some embodiments, the three-dimensional sensor image data further includes color image data (e.g., an RGB image). Any optical depth camera may be used to measure the surface of the patient, with or without clothes.

The placement of one or more cameras in the medical image scanning room (e.g., a CT scanning room, a PET scanning room, a MR scanning room, and/or the like) may be determined empirically to achieve optimal performance of the analytics. Various factors that may influence performance include, for example, the ease and/or expense of sensor installation, patient visibility constraints (e.g., the quality of the obtainable data), and sensor noise characteristics. For example, with structured-light devices and time-of-flight devices, noise tends to increase as distance from the sensor increases. Moreover, depending on wavelength, noise may also increase near the sensor. Thus, sensor noise characteristics may be balanced against the field of view of the sensor when determining placement of a sensor.

Figure 3:
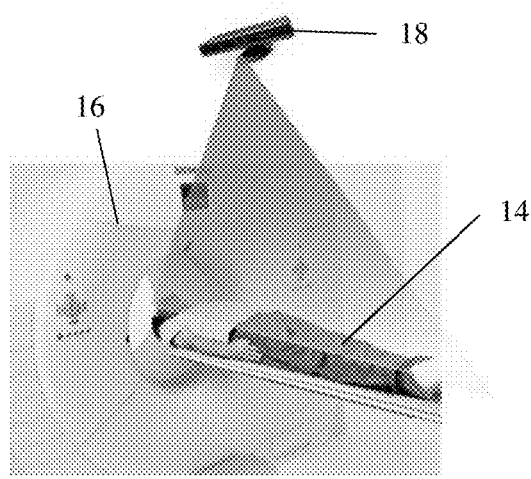
FIG. 3 illustrates one embodiment of a system for patient positioning for scanning.
Figure 5:
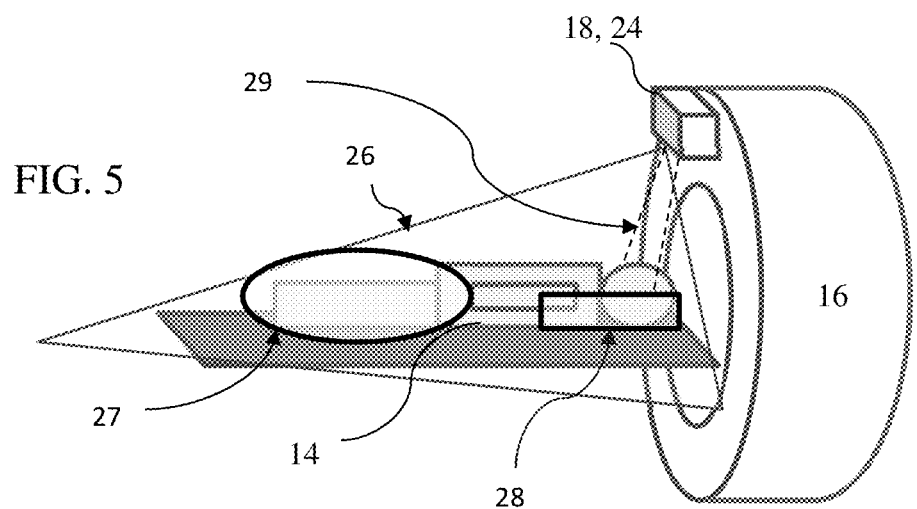
FIG. 5 is a block diagram of another embodiment of a system for patient positioning for scanning.

To achieve reliable surface reconstruction from depth images, the cameras may be mounted such that the cameras have an unobstructed view of the patient lying on the patient table. Depending on the sensor noise characteristics (e.g., image quality and/or resolution of captured depth-image), the camera(s) may be mounted close to the scanner table while still being able to keep the entire or majority of the patient within the camera view. FIGS. 3 and 5 show example placements of the depth sensor 18 relative to the patient 14 and the medical scanner 16. In FIG. 3, the camera depth sensor 18 is positioned on the ceiling above the patient table and in front of an entry into the bore of the medical scanner 16. In FIG. 5, the camera depth sensor 18 is positioned on the gantry of the medical scanner 16.

Only one or more than one camera may be used, such as a first camera positioned on the ceiling directly above a patient table, and a second camera positioned at one end of the patient table. The two locations—overhead and angled—each have their advantages and disadvantages. For example, with an overhead camera, the analytics problem is more constrained and results that are more accurate may be obtained. However, the overhead camera presents challenges from an installation perspective since the camera is to be mounted on the ceiling. By contrast, the angled camera may have a lower installation overhead (e.g., the camera may even be attached to the gantry at the time of shipment). However, with the angled view, some patient data may be obscured.

In one embodiment, the depth measurements from the sensor provide a 3D point cloud of the patient. The 3D point cloud may be reconstructed and used for further processing. Data may also be captured from both cameras and fused to obtain a more accurate 3D point cloud. Since the two cameras are fixed, the cameras may be stereo calibrated (e.g., camera positions may be estimated relative to one another). Given the calibration information, the data from the two cameras may then be combined to obtain a denser point cloud representation of the scene.

The scan data or depth image may be rendered, segmented, and/or image processed to determine the pose. The previous scan or depth data may be rendered so that the patient outline (skin, body) is visible. The rendering is used as the pose.

In one embodiment, template matching is used to determine the pose. Different templates representing different poses are registered with the scan data or the depth data (e.g., point cloud). The template with the greatest similarity provides the pose. Instead of template matching, classification may be used. For example, a probabilistic boosting tree or other machine learning is used to learn to distinguish between poses and/or to output pose parameters based on an input vector. The input vector (e.g., HAAR wavelets) is derived from the scan and/or depth data. The machine learning uses many examples of input vectors with known pose information (i.e., training data) to learn to distinguish between poses. Hierarchal, sequential binary, or other combinations of classifiers may be used for different aspects of pose, such as one classifier for torso orientation and another for arm position. Alternatively, one classifier provides values for all the pose parameters. Once trained, the classifier or classifiers use calculated input vectors from the scan or depth data to classify the pose of the patient in the corresponding examination.

In another embodiment, template matching, machine learning, or other image process identifies landmarks. For example, the hand, elbow, arm, head, hip, shoulders, knees, feet, legs, and/or other body parts (e.g., nose or eyes) are identified. The relative position of the landmarks indicates the pose.

In yet another embodiment, a parameterized deformable model is fit to a point cloud of the depth camera image, to the scan data, or to both. The model may be a skeleton or connected lines. The fitting positions the skeletonized lines to the data. In another approach, the model is a three-dimensional mesh (e.g., polygon mesh), but other surfaces or representations (e.g., point cloud) may be used. The control parameters or settable parameters of the model are limited, such as associated with joint rotation, so that the model may be transformed or manipulated to different body poses. Any human body modeling may be used. The modeling may or may not also account for the shape of the person as well as pose. The pose deformation may be rigid, non-rigid, or a combination of both. A rotation matrix restricts polygons of the same body part to the same rotation. For rigid deformation, a regression function for each triangle may be used to learn the pose deformation model to estimate based on twists of the nearest joints. Given a deformation matrix, a regression parameter is calculated. For non-rigid deformation, the distance between the deformed template mesh and the training mesh is minimized in an optimization constrained by smoothness and with a preference for similar deformation in adjacent polygons of the same body part. After training, the mesh model is fit to the scan or depth data by fitting using different values for the rigid rotation matrix. Other approaches may be used.

In other embodiments, a model, such as a pictorial structure model, is learned with machine training. The model includes body parts and/or landmarks. The learnt model is fit to the scan data, such as fitting with a joint likelihood maximization. Different body parts or landmarks in the model may be sequentially fit. Body part size or extent may be extrapolated from patient height. The region boundaries may be constrained to be within learnt ranges based on height.

Other fitting may be used to determine the pose.

The template, landmarks, mesh, classifier output, and/or other results of the fitting provide values 31 for pose parameters. For example, the template, mesh, or other model is labeled. A give relative positioning indicates the position of the body part, such as arms at the side of the torso. The classifier or other output may be the label. The labels provide or are descriptors of the pose. A shape description vector representing the pose is determined. The descriptors indicate the value of variable pose parameters, such as arm position, leg position, head orientation, resting side (e.g., torso orientation), or combinations thereof. Alternatively, the pose is represented by the model without specific labels (e.g., an image, point cloud, mesh, or rendering provides the pose with and/or without values or positions for labeled body parts).

In act 32, the patient on the bed of a medical scanner is sensed. For a current examination, the patient is positioned on the bed of the medical scanner. Prior to positioning the bed within the scanner for scanning or once the bed is positioned for scanning, the patient is sensed. For the current examination, the pose is to conform to the previous or desired pose determined in act 30. For example, the patient is sensed to acquire data to determine the current pose for comparison with the desired pose (e.g., pose from a previous examination).

Any patient sensing may be used. For example, a depth camera or the medical scanner senses the patient. The depth camera or cameras are the same or different than used for a previous examination. The camera or cameras may have the same or different perspectives as in a previous examination. As another example, the medical scanner scans the patient (e.g., CT or MRI scan). The sensor (e.g., depth camera and/or scanner) captures data representing the patient on the bed of the medical scanner. The data is a three-dimensional point cloud, cross-section image, three-dimensional volume (e.g., voxels), or other collection of data representing the patient on the bed. The data is used "as is" for determining the pose or is further processed (e.g., filtered and/or combined) to then be used to determine the pose.

In act 34, the pose of the patient is determined. The patient data captured in act 32 is used to determine the pose. The pose of the patient as the patient lies on patient bed in anticipation of the medical scan for diagnosis is determined.

The determination uses the same or different approach as used for determining the desired pose of act 30. Since the protocol itself may not represent the current pose of the patient, the captured data is used. Based on machine learnt classification, mesh fitting, model fitting, template matching, or other approach, a processor determines the pose from the captured data.

The determined pose is parameterized in the same way as the desired pose. For example, descriptors of body part positions are used. As another example, descriptors of body parts without position are used. In yet another example, the pose is represented by an outline or image of the patient. The pose results 35 of the current patient pose are used for comparison with the results 31 for the desired pose.

In act 36, the desired pose is compared to the current pose. For example, the pose from a protocol or previous examination is compared to the current pose. The processor compares to identify a match and/or differences.

In one embodiment, the comparison is of images, renderings, or fit models. By subtracting one from the other, differences in the pose are identified. A distance threshold may be used, such that differences greater than a threshold amount are identified. Other image processing to find differences may be used.

In another embodiment, the comparison is of the descriptors. The absolute position may not be important, but deviations in arm positions or head orientations may be detected and corrected before the scan. By comparing descriptors, matches and differences in the descriptors of importance to a given scan are found. All the descriptors or only a sub-set may be compared. The descriptor for a given body part may have a binary (e.g., legs apart or together) or a restricted set of options (e.g., torso on side, on front, or on back). Where the options from the desired pose and the current pose match, the comparison indicates that this aspect of the poses are the same. Where the options for a given body part from the desired pose and the current pose are different, the comparison indicates that this aspect of the poses do not match or are not aligned. The comparison is of measures or parameters of the patients' pose.

In act 38, the processor transmits a change in pose based on the comparison. The difference from the comparison indicates a change to be made to the current pose. For example, the current pose is the person laying on their left side. The desired pose is laying on their right side. The difference in the descriptor for torso rotation is found by the comparison. The change is in the torso rotation and/or is from left side to right side. The pose for the body part from the desired pose indicate where the body part should be positioned. The pose from the current pose indicates the wrong position. The change is indicated by the correct position, the incorrect position, or a transition between the two positions.

The change is transmitted so that the current pose will then match the desired pose. All the changes to match, a sequence of changes, or any number of changes may be transmitted. The process may be iterated through a hierarchy or sequence of successive changes (e.g., torso orientation first, then leg, and them arm). The acts for current position determination and comparison are repeated. Once there are no differences, the current pose matches the desired pose. A generic ideal patient position or previous patient position is computed against the current patient position to ensure a consistent and quality scan and reduce the involvement of the scanner operator.

The transmission is to a speaker and/or display. The change is communicated to the patient, physician, and/or technician. For example, transmission to the speaker is of audio instructions. The instructions note the body part and the position. For example, the determined difference could result in a command "please place left arm down." Other verbal indications of the change may be used.

For visual indications, the change may be an instruction. For example, the "place left arm down" instruction is output to a display or projected onto the patient, wall, or other surface. Other visual indications may be used. FIG. 5 shows an example. A projector projects the change onto the patient 14 and/or the patient bed. The legs are in a correct position and the left arm is in an incorrect position as the left arm should be placed above or beside the head. By projecting the correct pose onto the patient, differences may be seen. A rendering of the desired pose (e.g., rendering from scan data, point cloud, or generic model) is displayed as an image. An outline of the desired pose may be projected. The patient is then placed on the table in a way to match roughly the outline or image, or the patient is moved after being on the table to match the outline or image.

The change may be highlighted, such as providing the body parts in the desired pose in green (area 27) and providing body parts to be changed to the desired pose in red (area 28). The deviations in pose are reflected in the projection. Other highlighting may be used, such as overlaying arrows or an animation of moving the body part to the desired position.

The display may be to a monitor or screen. For example, the desired pose, an outline of the desired pose, descriptors of the desired pose or other visual representation is provided on a monitor of the medical scanner or other workstation. The change may be reflected by comparison on the display, such as showing the current pose or an image of the current pose and the desire pose adjacent or overlaying each other. The change is reflected in the visual differences. The comparison on the screen shows the change. Alternatively, the body parts shown, highlighting, or other emphasis based on the comparison increases the visual focus on the body parts to be altered. The processor-based comparison is used to alter the display to show the desired change.

As represented in FIG. 2, this process may be repeated. After or once the patient pose is altered, the captured data reflects the alteration. The resulting current pose is compared with the desired pose. Where there are differences, then a recommendation to alter the current pose is output. Where there are not differences, then the diagnostic scan or treatment scan may begin.

In act 40, the medical scanner scans the patient. After conforming the pose of the patient to the desired pose, the scan begins. The change in pose of the patient in response to the transmittal is confirmed by the processor. Alternatively, the change in pose is confirmed by the patient, physician, or technician. Rather than repeat the capture of act 32, determination of pose of act 34, and comparison of act 36, the operator of the medical scanner confirms having performed the change or changes, such as by activating the scan.

The patient bed moves the patient in the desired pose into a bore or other scan region. Alternatively, the patient bed remains in the bore or scan region. The scanning begins. Any type of diagnostic or treatment scan may be used, such as x-ray, ultrasound, CT, MRI, PET, fluoroscopy, and/or combinations thereof. The examination is performed by the medical scanner and with the patient in the desired pose.

The scan provides scan data representing the patient. The scan data represents a two-dimensional region or a three-dimensional region of the patient. The scan data represents the patient at one period or includes representations over time (e.g., frame of data or volume every fraction of a second).

In act 42, the processor spatially registers scan data from the current examination with the scan data from the previous examination. Any spatial registration may be used, such as rigid or non-rigid. The spatial registration allows for calculation of change over time. For example, a change in size of a spatially aligned tumor from different times indicates whether treatment is satisfactory or whether treatment is needed. The results of the current examination may be used for other purposes, such as diagnosis.

Since the pose is the same for both examinations, there is less likely to be errors in the spatial alignment. The scan data from the different examinations more likely does not include differences without diagnostic significance. The registration may be more accurate when not dealing with segmentation or other operations to account for differences in pose.

Figure 4:
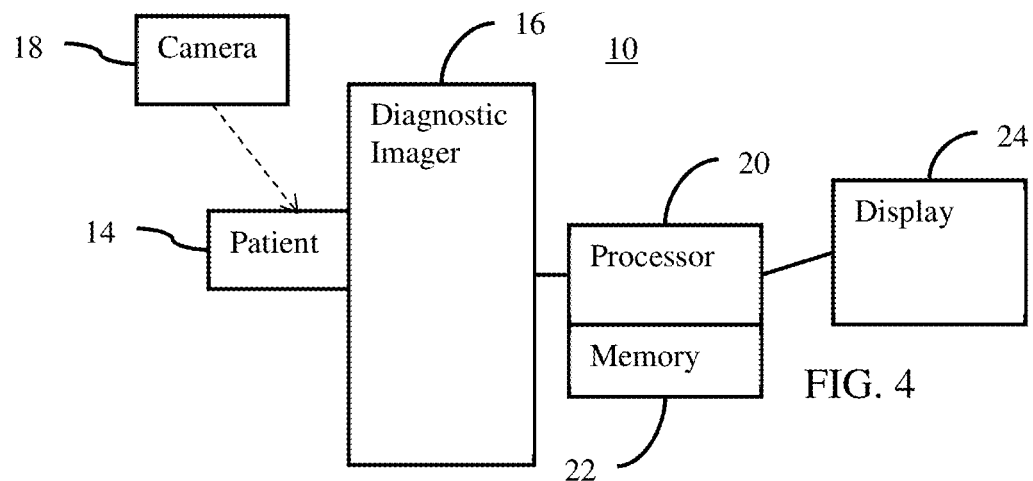
FIG. 4 is a block diagram of one embodiment of a system for patient positioning for scanning.

FIG. 4 shows one embodiment of a system 10 for patient positioning for scanning. The system implements the method of FIG. 1, FIG. 2, or a different method. By automatically detecting a current position and comparing the current position to a desired position, the system 10 assists in proper positioning of the patient for scanning. Rather than relying on the patient, physician, or technician to remember, review a protocol, or review case notes, the position or change in position is indicated automatically for consistent positioning.

The system 10 is at a point of care for a patient 14, such as in a same room, hospital, or imaging center. In other embodiments, the processor 20, memory 22, and/or display 24 are at other locations, such as a different building. The system 10 is used to position the patient for scanning. In one embodiment, the camera 18 is used to determine a current pose without an x-ray-based radiation scout scan of the patient 14, limiting exposure of the patient to radiation.

The system 10 includes one or more cameras 18, the diagnostic imager 16, the processor 20, the memory 22, and the display 24. Additional, different, or fewer components may be provided. For example, the display 24 is not provided, but a speaker is provided. As another example, a user input device is provided for the user to configure or activate the diagnostic imager 16. In yet another example, the camera 18 is not provided, such as where scan data is used instead of a depth image.

The processor 20, memory 22, and display 24 are part of the diagnostic imager 16 in one embodiment, such as being a CT workstation. In other embodiments, the processor 20, memory 22, and/or display 24 are part of a separate computer, such as a separate workstation, personal computer, laptop, or tablet. The processor 20 and/or memory 22 may be part of a server. In other embodiments, the memory 22 is a database separate from the processor 20.

The diagnostic imager 16 is a medical diagnostic imaging device or scanner. For example, the diagnostic imager 16 is a CT scanner with an x-ray source and detector connected on a gantry that moves relative to a patient bed. The patient bed includes robotics or motors for moving the patient into or relative to a z axis through the bore and up and down within the bore. The diagnostic imager 16 scans the patient over a range along the longitudinal axis of the patient with part of the patient positioned in an iso-center of the bore. In alternative embodiments, an MR, PET, SPECT, fluoroscopy, x-ray, ultrasound, or other medical imaging system is used instead of a CT scanner. In alternative embodiments, a treatment device or scanner, such as an x-ray scanner is used. The diagnostic imager 16 may be used for diagnostic scanning and/or treatment.

The camera 18 is a depth sensor. Stereo cameras, structured light transmission with a camera as the sensor, time-of-flight sensor with a transmitter, or other now known or later developed sensor for determining depth is provided as the camera 18. In one embodiment, the camera 18 is an optical RGB-D camera.

The camera 18 is configured to detect a surface of a body or object. The surface is detected in three dimensions. The camera 18 captures an image or images from which depth may be derived. Alternatively, the camera 18 directly captures a 3D point cloud of different depth measurements. Image processing may be applied to remove background. Alternatively, the background remains and is dealt with as part of mesh fitting.

The patient 14 is positioned relative to the camera 18, such as on the bed of the diagnostic imager 16 while the bed is outside of the bore of the diagnostic imager 16. The camera 18 may be positioned to image the patient 14 while the patient 14 is within the bore. Where multiple cameras 18 are provided, the cameras 18 are directed to view the patient 14 from different directions. Depth data representing the surface of the patient is acquired from the different cameras 18 and used together to create a unified point cloud or surface representation.

The surface of the patient 14 is the skin of the patient. Alternatively, the surface of the patient 14 is clothing of the patient. The surface may be low pass filtered to remove high frequency variation. Depth information for combinations of skin and clothing may be detected.

The processor 20 is a general processor, central processing unit, controller, control processor, graphics processor, digital signal processor, three-dimensional rendering processor, image processor, application specific integrated circuit, field programmable gate array, digital circuit, analog circuit, combinations thereof, or other now known or later developed device for accessing data, determining pose, comparing poses, transmitting changes in pose, controlling scanning, and/or spatially registering scan data from different times. The processor 20 is a single device or multiple devices operating in serial, parallel, or separately. The processor 20 may be a main processor of a computer, such as a laptop or desktop computer, or may be a processor for handling some tasks in a larger system, such as in a medical imaging system. The processor 20 is configured by instructions, design, hardware, and/or software to be able to perform the acts discussed herein.

The processor 20 is configured to determine a pose of the body from a surface captured by the camera 18 or from scan data captured by the diagnostic imager 16. The processor 20 is configured to identify a difference in the pose of the body from another pose. The other pose is a desired pose, such as from a protocol or a pose derived from data from a previous scan. The processor 20 may look up the other pose or may determine the other pose from scan data or a depth camera image acquired at a previous time. Based on the comparison, the processor 20 is configured to identify a change in pose of the current patient to match the desired pose. The change may be a difference in pose. The processor 20 is configured to transmit the change or pose information to correct the current pose, such as transmitting an image with a graphic, highlighting, or animation.

The memory 22 is a graphics processing memory, a video random access memory, a random access memory, system memory, random access memory, cache memory, hard drive, optical media, magnetic media, flash drive, buffer, database, combinations thereof, or other now known or later developed memory device for storing data or video information. The memory 22 is part of the diagnostic imager 16, part of a computer associated with the processor 20, part of a database, part of another system, a picture archival memory, or a standalone device.

The memory 22 stores data used by the processor 20. For example, the memory 22 stores a protocol or a desired pose, captured data, and/or scan data. In another example, the memory 22 stores a model, templates, machine-learnt classifiers, and/or other data used to determine and compare poses. As another example, the memory 22 stores data used in processing, such as a mesh, fitted mesh, parameters used in fitting, and/or matrices. In yet another example, the memory 22 stores results, such as pose vectors, differences in pose, images, graphic overlays, highlighting, or changes. Any data used, input to, output by, or created for the acts discussed herein may be stored in the memory 22 or another memory.

The memory 22 or other memory is alternatively or additionally a computer readable storage medium storing data representing instructions executable by the programmed processor 20 and/or diagnostic imager 16. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The display 24 is a liquid crystal display (LCD), an organic light emitting diode (OLED), a flat panel display, a solid state display, a cathode ray tube (CRT), a projector, a printer, or other now known or later developed display device for outputting an image with highlighting, graphics showing change, graphics showing a pose, animation showing change, instructions, or other information. The display 24 may be part of a user interface.

The display 24 is configured by a display plane buffer or data provided by the processor 20. The display 24 is configured to indicate results from comparing poses, a desired pose, differences in poses, a change to provide the desired pose, or other information.

In one embodiment, the display 24 is a projector configured to indicate a change to reduce a difference between a desired pose and the current pose of a patient. The desired pose is projected onto the body of the patient and/or patient bed with the difference from the current pose highlighted.

Using the camera captured data, the processor 20 may determine a location of the eyes of the patient. The projection may include a dark (e.g., black) region projected to the eyes of the patient.

FIG. 5 shows another embodiment of the system 10. The system 10 ensures consistent patient positioning during subsequent image acquisitions for improved comparison and registration. The previous volume or RGB-D data is used to model the patient position. The RGB-D image from the camera 18 and/or possibly diagnostic scan from the scanner 16 is used to assess current patient position. The previous scan and/or RGB-D data (if available) is used to compute the desired patient orientation and position. The required changes to arrive at the ideal or previous patient position is then communicated via a monitor or more intuitively by an attached projector 24. In the diagram, the projector 24 avoids (projects black) the region 29 of the patient's eyes. Green body regions 27 are projected onto properly aligned body parts. Red outlines 28 are projected on improperly aligned parts or where a part should be positioned, such as projecting an outline as to where the improperly aligned part should be orientated. In the case of a monitor, an overlay of the expected position on the RGB camera view of the patient may be performed. Similar region highlighting colors or graphics may be employed on the monitor.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for patient positioning for scanning, the method comprising:

determining a first pose of a patient from a first examination, the first pose determined from a first body outline of the patient from scan data from the first examination, wherein the first pose includes a relative position of a first body part with respect to a moveable second body part or with respect to a bed of a medical scanner, the medical scanner comprising a computed tomography, magnetic resonance, x-ray, or emission tomography scanner where the scan data comprises computed tomography, magnetic resonance, x-ray, or emission tomography scan data;

sensing, by the medical scanner, a patient on the bed of the medical scanner for a second examination at a different time than the first examination;

determining a second pose of the patient from a second body outline of the patient from scan data of the sensing, wherein the second pose includes the relative position of the first body part with respect to the moveable second body part or with respect to the bed of the medical scanner;

comparing the first pose to the second pose; and transmitting a change in pose so that the second pose matches the first pose, wherein the change in pose is based on the comparing;

wherein determining the first and second poses comprises fitting a parameterized deformable model to the scan data, the parameterized deformable model formed by connected lines with settable parameters limited to being for joint rotations.

2. The method of claim 1 wherein determining the first pose comprises identifying relative positions of first landmarks, and wherein determining the second pose comprises identifying relative positions of second landmarks.

3. The method of claim 1 wherein determining the first pose comprises determining the first pose from the first examination comprising a previous examination for diagnosis prior to diagnosis where the second examination occurs after treatment based on the diagnosis.

4. The method of claim 1 wherein determining the first pose comprises determining the first pose from the first examination where the first pose of the patient was established without a plan for treatment.

5. The method of claim 1 wherein the first and second poses are parameterized by descriptors of arm position, head orientation, leg position, torso orientation, or combinations thereof and wherein comparing comprises comparing the descriptors.

6. The method of claim 1 wherein comparing comprises identifying a difference of the second pose from the first pose.

7. The method of claim 1 wherein transmitting comprises outputting audio of the change.

8. The method of claim 1 wherein transmitting comprises displaying the change.

9. The method of claim 8 wherein displaying comprises projecting a body part in a position reflecting the change.

10. The method of claim 1 further comprising performing the second examination with the medical scanner and spatially registering the scan data of the first examination with scan data of the second examination.

11. The method of claim 1 wherein determining the first pose and the second pose comprises determining with a machine-learned classifier.

12. A method for patient positioning for scanning, the method comprising:

determining a first pose of a patient from a first examination, the first pose determined from a first body outline of the patient from scan data from the first examination, wherein the first pose includes a relative position of a first body part with respect to a moveable second body part or with respect to a bed of a medical scanner, the medical scanner comprising a computed tomography, magnetic resonance, x-ray, or emission tomography scanner where the scan data comprises computed tomography, magnetic resonance, x-ray, or emission tomography scan data;

sensing, by the medical scanner, a patient on the bed of the medical scanner for a second examination at a different time than the first examination;

determining a second pose of the patient from a second body outline of the patient from scan data of the sensing, wherein the second pose includes the relative position of the first body part with respect to the moveable second body part or with respect to the bed of the medical scanner;

comparing the first pose to the second pose; and transmitting a change in pose so that the second pose matches the first pose, wherein the change in pose is based on the comparing;

wherein determining the first and second poses comprises determining arm position relative to torso, leg position with legs spread or legs together, head orientation relative to torso or shoulders, head and feet orientation, or combinations thereof.

13. A method for patient positioning for scanning, the method comprising:

determining a first pose of a patient from a first examination, the first pose determined from a first body outline of the patient from scan data from the first examination, wherein the first pose includes a relative position of a first body part with respect to a moveable second body part or with respect to a bed of a medical scanner, the medical scanner comprising a computed tomography, magnetic resonance, x-ray, or emission tomography scanner where the scan data comprises computed tomography, magnetic resonance, x-ray, or emission tomography scan data;

sensing, by the medical scanner, a patient on the bed of the medical scanner for a second examination at a different time than the first examination;

determining a second pose of the patient from a second body outline of the patient from scan data of the sensing, wherein the second pose includes the relative position of the first body part with respect to the moveable second body part or with respect to the bed of the medical scanner;

comparing the first pose to the second pose; and transmitting a change in pose so that the second pose matches the first pose, wherein the change in pose is based on the comparing;

wherein determining the first and second poses comprises fitting pictorial structure models to the scan data of the first examination and to the scan data of the sensing, the pictorial structure models comprising machine learned models.

* * * * *